Patented June 11, 1940

2,204,135

UNITED STATES PATENT OFFICE 2,204,135

CHLORINATION OF KETONES

Paul C. Jones, Akron, Ohio, assignor to The B. F. Goodrich Company, New York, N. Y., a corporation of New York No Drawing. Application June 7, 1938,
Serial No. 212,298

6 Claims. (Cl. 260—593)

This invention relates to the liquid phase chlorination of ketones, and has as its object to provide a method whereby the chlorination may be safely performed without the production of excessive amounts of by-products.

In carrying out the liquid phase chlorination of ketones by passing gaseous chlorine into the liquid ketone at ordinary temperatures, the chlorine dissolves in the ketone, but no reaction occurs. After some time, the reaction occurs with uncontrollable vigor. This period of time between the introduction of chlorine and the start of the reaction is called the induction period. The induction period can be reduced by performing the chlorination at higher temperatures, but raising the temperature decreases the yield of the desired monochlorinated products and increases the amount of polychloride and tarry by-products formed.

I have discovered that the induction period can be reduced by performing the chlorination in the presence of a catalyst. By this method, when the chlorine is passed into the ketone at ordinary temperatures, the reaction starts immediately or in a short time and proceeds smoothly to form good yields of the monochlorinated products.

The catalysts which are employed are either acids or are capable of generating acids upon hydrolysis or upon contact with organic substances and are generally termed "acidic catalysts." The preferred catalysts are the mineral acids such as hydrochloric acid, hydrobromic acid, hydrofluoric acid, nitric acid and sulfuric acid. Other acidic materials such as sulfur chloride, phosphorous oxychloride, and phosphorous pentachloride gave reductions in the induction period comparable to those obtained with mineral acids. Salts such as ammonium chloride, ammonium bromide, and antimony trichloride gave good results in the presence of moisture. It is desirable, therefore, to add the salts in water solution or to add a very small amount of water to the ketone before the chlorine is introduced.

The catalyst may be added in any suitable small proportion, from 0.2% to 3% based on the weight of ketone, for instance. Smaller amounts of the more active materials such as the mineral acids than of the less active materials such as ammonium chloride are usually required.

The catalysts of this invention may be used to assist in the liquid phase chlorination of any aliphatic ketone, whether or not it contains aromatic radicals. Specifically, the process is applicable to the chlorination of acetone, 2-pentanone, 3-pentanone, 2-butanone, methyl isopropyl ketone, acetophenone, etc.

As a specific embodiment of one modification of the invention, chlorine was passed into 2-butanone at 20° C. in the presence of 1% of hydrochloric acid. A green color showing solution of chlorine in the ketone appeared momentarily, but it disappeared immediately showing the practically instantaneous reaction of the chlorine and ketone. The reaction progressed smoothly to completion without reappearance of the green color. When the reaction was performed in the absence of a catalyst at 20° C., however, there was an induction period of several minutes, and the reaction occurred with explosive violence shooting some of the product out of the reaction vessel. The 2-butanone had to be heated to about 60° C. before the chlorine reacted immediately and at this temperature lower yields of the monochlorinated ketones were obtained.

Although I have herein disclosed a specific embodiment of my invention, I do not wish to limit myself solely thereto, for it is obvious that many modifications are within the spirit and scope of the invention as defined in the appended claims.

I claim:

1. The method of preparing a monochlorinated ketone which comprises passing gaseous chlorine at ordinary temperatures into a liquid consisting of an aliphatic ketone and a small proportion of a catalyst selected from the class consisting of mineral acids and substances which are capable of generating mineral acids upon hydrolysis or upon contact with organic substances.

2. The method of preparing a monochlorinated ketone which comprises passing gaseous chlorine at ordinary temperatures into a liquid consisting of an aliphatic ketone and a small proportion of a mineral acid.

3. The method of preparing a monochlorinated ketone which comprises passing gaseous chlorine at ordinary temperatures into a liquid consisting of an aliphatic ketone and a small proportion of hydrochloric acid.

4. The method of preparing monochlor-2-butanone which comprises passing gaseous chlorine at ordinary temperatures into a liquid consisting of 2-butanone and a small proportion of a catalyst selected from the class consisting of mineral acids and substances which are capable of generating mineral acids upon hydrolysis or upon contact with organic substances.

5. The method of preparing monochlor-2-butanone which comprises passing gaseous chlorine at ordinary temperatures into a liquid consisting of 2-butanone and a small proportion of a mineral acid.

6. The method of preparing monochlor-2-butanone which comprises passing gaseous chlorine at ordinary temperatures into a liquid consisting of 2-butanone and a small proportion of hydrochloric acid.

PAUL C. JONES.